Dec. 1, 1942.  D. A. S. HALE  2,303,933
METHOD OF WELDING
Filed Feb. 5, 1942

INVENTOR
D. A. S. HALE
BY
John A Hall
ATTORNEY

Patented Dec. 1, 1942

2,303,933

UNITED STATES PATENT OFFICE 2,303,933

METHOD OF WELDING

Douglas A. S. Hale, Ramsey, N. J., assignor to Bell Telephone Laboratories, Incorporated, New York, N. Y., a corporation of New York Application February 5, 1942, Serial No. 429,636

3 Claims. (Cl. 219—10)

This invention relates to methods of forming joints in metal work and has for its object to provide a method whereby one piece of metal may be united to another by a perfectly tight and homogeneous union and in a simple, cheap and effective manner.

Certain metals such as molybdenum when rolled to size in sheets or strips, form laminated structures, with the laminar planes parallel to the rolled surfaces. Direct spot welding such a material to another metal, typically nickel, gives rise to a condition which makes such a weld of doubtful use where its mechanical strength is important. The weld under strain is quite likely to yield by stripping away the laminae of the molybdenum on the face next to the nickel.

The method of the present invention is an extension of the method usually known as projection welding. In accordance with the present method the projection is completely pierced, leaving upturned or protruding edges on one side. This protruding edge serves to concentrate the welding current as in projection welding. Upon consummating the weld, the projecting edge of the molybdenum buries itself in the nickel and the molten nickel wells up inside the opening forced in the molybdenum and upon freezing forms an interlocking key therewith which will effectively prevent the stripping of the laminae of the molybdenum.

A feature of the invention is a keyed weld between a thin piece of metal having a tendency toward a laminated structure and another metal having a comparatively lower melting point, consisting essentially of a pierced hole in the thin laminated structure through which molten metal of the other metal has been forced and cooled to form an interlocking key.

The drawing consists of a single sheet having four figures as follows.

Figure 3:
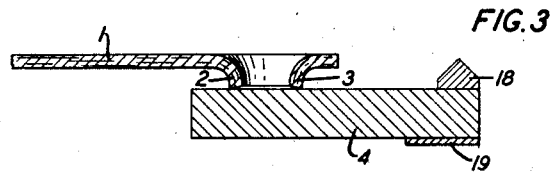
Fig. 3 is an enlarged section of a strip of molybdenum and a piece of magnetic material before a weld is made.
Figure 4:
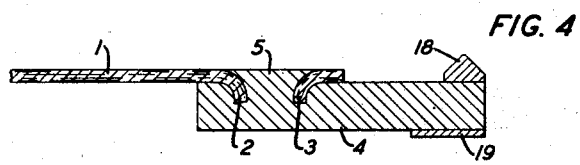
Fig. 4 shows the same after a weld has been made.

Looking first at Fig. 3, the piece 1 represents a thin strip of molybdenum which in the process of rolling assumes a laminated structure. In order to make the weld this strip is pricked so that a hole is forced through it having protruding edges 2 and 3. When a weld is to be made these edges are pressed against the other metallic part 4 and a welding current passed through this contact by any well-known means. The welding current being concentrated at the point of contact causes heating of the metallic part 4 to the extent that the protruding edges 2 and 3 bury themselves in the part 4 and molten material of part 4 wells up through the hole so as to form an interlocking key 5. Contact metal elements 18 and 19 are welded to the piece 4 by any well-known prior art method.

Figure 1:
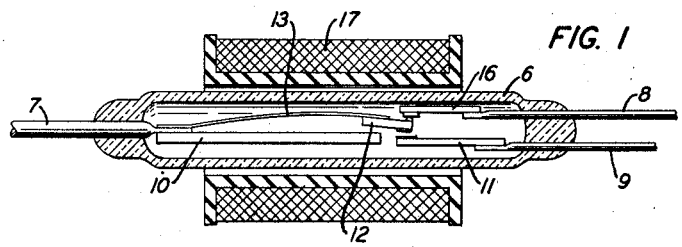
Fig. 1 shows in vertical cross section a switching device in which the present invention is employed.
Figure 2:
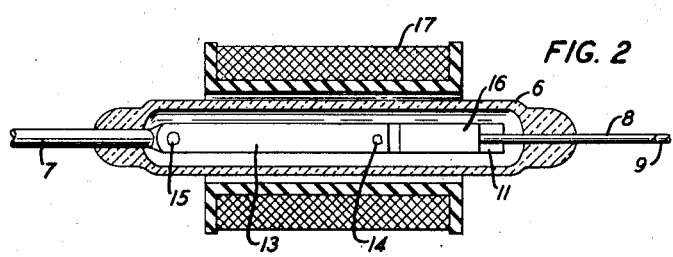
Fig. 2 is a cross section of the same taken in a horizontal plane.

This method of welding is particularly useful in pieces of small apparatus such as that shown in Figs. 1 and 2. Here a relay is shown consisting of an evacuated envelope 6 into one end of which a terminal 7 is sealed and into the other end of which the alternate terminals 8 and 9 are sealed. To the terminal 7 is welded a piece of magnetic material 10 and to the terminal 9 is welded another piece of magnetic material 11, leaving a gap between the ends of magnetic portions 10 and 11. This gap may be bridged by a piece of magnetic material 12. In order to keep this piece normally out of contact with the pieces 10 and 11 it is welded, by the method herein disclosed, to a molybdenum spring 13, the welds being indicated at the points 14 and 15. Molybdenum is one of the few satisfactory materials out of which the spring piece 13 can be made which will retain its elastic properties during the heat treatment necessary in constructing this relay device. The molybdenum, however, as heretofore pointed out, is subject to a laminated structure so that if the piece 12 were spot-welded to the spring 13 in the ordinary manner, the weld would fail due to the stripping off of the first lamination.

In service the spring 13 holds the part 12 against a contact 16 attached to the terminal 8. A coil 17 surrounds the envelope 6 and when energized by an electric current will set up a field between the parts 10 and 11 sufficient to cause the movement of the part 12 to a bridging position whereby contact between the part 16 and the part 17 is broken and a contact between the part 10 and the part 11 is made.

What is claimed is:

1. The method of joining a comparatively high melting point thin laminated piece of metal to a comparatively low melting point piece of metal, which consists of forcing an opening with upturned edges in the said thin laminated piece, pressing the said upturned edges thereof against the said other piece and passing welding current through the connection thus formed until molten metal of the said comparatively low melting point metal wells up through the said opening in sufficient quantity to form an interlocking key upon cooling.

2. The method of welding thin sheet molybdenum to another metal which has a melting point lower than the melting point of molybdenum, which consists of forcing an opening with upturned edges in the sheet of molybdenum, pressing the said upturned edges against the said other metal and passing a welding current through the connection thus established until molten metal of said other metal wells up through the said opening in the said sheet of molybdenum in sufficient quantity to form an interlocking joint between said metals.

3. The method of welding thin sheet molybdenum to nickel, which consists of forcing an opening with upturned edges in the sheet of molybdenum, pressing the said upturned edges against the nickel and passing a welding current through the connection thus established until molten nickel wells up through the opening in the molybdenum in sufficient quantity to form an interlocking joint therebetween.

DOUGLAS A. S. HALE.